(12) United States Patent
Abts et al.

(10) Patent No.: US 9,929,960 B1
(45) Date of Patent: *Mar. 27, 2018

(54) SYSTEMS AND METHODS FOR ROUTING DATA THROUGH DATA CENTERS USING AN INDIRECT GENERALIZED HYPERCUBE NETWORK

(71) Applicant: Google Inc., Mountain View, CA (US)

(72) Inventors: Dennis Charles Abts, Eau Claire, WI (US); Abdul Kabbani, Los Gatos, CA (US); Robert Felderman, Portola Valley, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/609,847

(22) Filed: May 31, 2017

Related U.S. Application Data

(63) Continuation of application No. 14/149,469, filed on Jan. 7, 2014, now Pat. No. 9,705,798.

(51) Int. Cl.
*H04L 12/803* (2013.01)
*H04L 12/707* (2013.01)
*H04L 12/26* (2006.01)

(52) U.S. Cl.
CPC ........ *H04L 47/122* (2013.01); *H04L 43/0888* (2013.01); *H04L 45/22* (2013.01)

(58) Field of Classification Search
None
See application file for complete search history.

(56) References Cited

U.S. PATENT DOCUMENTS

| | | |
|---|---|---|
| 6,151,297 A | 11/2000 | Congdon et al. |
| 6,456,588 B1 | 9/2002 | Simmons |
| 6,696,917 B1 | 2/2004 | Heitner et al. |

(Continued)

OTHER PUBLICATIONS

Abts, et al., Achieving Predictable Performance through Better Memory Controller Placement in many Core CMPs, ACM Sigarch Computer Architecture News, vol. 37, No. 3, Jun. 2009, p. 451-462.

(Continued)

*Primary Examiner* — Angela Nguyen
(74) *Attorney, Agent, or Firm* — McDermott Will & Emery LLP

(57) ABSTRACT

Aspects and implementations of the present disclosure are directed to an indirect generalized hypercube network in a computer network facility. Servers in the computer network facility participate in both an over-subscribed fat tree network hierarchy culminating in a gateway connection to external networks and in an indirect hypercube network interconnecting a plurality of servers in the fat tree. The participant servers have multiple network interface ports, including at least one port for a link to an edge layer network device of the fat tree and at least one port for a link to a peer server in the indirect hypercube network. Servers are grouped by edge layer network device to form virtual switches in the indirect hypercube network and data packets are routed between servers using routes through the virtual switches. Routes leverage properties of the hypercube topology. Participant servers function as destination points and as virtual interfaces for the virtual switches.

20 Claims, 9 Drawing Sheets

(56) References Cited

U.S. PATENT DOCUMENTS

| | | | |
|---|---|---|---|
| 8,065,433 | B2 | 11/2011 | Guo et al. |
| 8,412,919 | B2 | 4/2013 | Luo |
| 9,288,101 | B1* | 3/2016 | Dalal .................... H04L 47/193 |
| 9,436,639 | B1 | 9/2016 | Dalal et al. |
| 2011/0258340 | A1* | 10/2011 | Armstrong .......... H04L 12/4625 709/238 |
| 2012/0026917 | A1 | 2/2012 | Guo et al. |
| 2012/0230182 | A1 | 9/2012 | Southworth et al. |
| 2012/0250574 | A1 | 10/2012 | Marr |
| 2013/0111070 | A1 | 5/2013 | Mudigonda et al. |
| 2013/0250802 | A1 | 9/2013 | Yalagandula et al. |
| 2014/0119728 | A1 | 5/2014 | Zhang et al. |
| 2014/0122560 | A1 | 5/2014 | Ramey et al. |
| 2014/0298113 | A1* | 10/2014 | Sakurai ............... G06F 11/2025 714/47.3 |

OTHER PUBLICATIONS

Ahn et al., HyperX: Topology Routing and Packaging of Efficient Large-Scale Networks, Proceedings of the conference on High Performance Computing Networking, Storage and Analysis, IEEE, Nov. 2009, pp. 1-11.

Al-Fares et al., A Scalable Commodity Data Center Network Architecture, ACM SIGCOMM Computer Communication Review, vol. 38, No. 4, ACM, Aug. 2008. pp. 63-74.

Al-Fares et al., Hedera: Dynamic Flow Scheduling for Data Center Networks, NSDI. vol. 10., 2010, 15 pgs.

Arimilli et al., The PERCS High Performance Interconnect, 2010 18th IEEE Symposium on High Performance Interconnects, IEEE, 2010, 8 pgs.

Batcher, Kenneth E., STARAN Parallel Processor System Hardware, Proceedings of the May 6-10, 1974 national computer conference and exposition, ACM, 1974, pp. 405-410.

Benson, et al., Network Traffic Characteristics of Data Centers in the Wild, Proceedings of the 10th ACM SIGCOMM conference on Internet measurement, ACM, 2010, 14 pgs.

Bhuyan, et al., Generalized Hypercube and Hyperbus Structures for a Computer, Computers, IEEE Transactions on Computers, vol. 100, No. 4, Apr. 1984, pp. 323-333.

Clos, Charles, A Study of Non-Blocking Switching Networks, Bell System Technical Journal, vol. 32, No. 2, 1953, pp. 406-424.

Dally, et al., Deadlock-Free Message Routing in Multiprocessor Interconnection Networks, IEEE Transactions on Computers, vol. 100, No. 5, 1987, pp. 547-553.

Dally, William J., Performance analysis of k-ary n-cube interconnection networks, IEEE Transactions on Computers, vol. 39, No. 6, Jun. 1990, p. 775-785.

Dean, et al., MapReduce: Simplified Data Processing on Large Clusters, Communications of the ACM, vol. 51, No. 1, 2008, pp. 107-113.

Glass et al., The Turn Model for Adaptive Routing, ACM SIGARCH Computer Architecture News, vol. 20, No. 2, ACM, Apr. 1992, pp. 278-287.

Greenberg et al., VL2: A Scalable and Flexible Data Center Network, ACM Sigcomm Computer Communication Review, vol. 39, No. 4, Aug. 2009, pp. 51-62.

Guo, et al., BCube: A High Performance Server-Centric Network Architecture for Modular Data Centers, ACM SIGCOMM Computer Communication Review, vol. 39, No. 4, 2009, 12 pgs.

Kermani et al., Virtual Cut Through a New Computer Communication Switching Technique, Computer Networks, vol. 3, No. 4, 1976, pp. 267-286.

Kim, et al., Adaptive Routing in High-Radix Clos Network, Proceedings of the ACM/IEEE SC 2006 Conference, Nov. 2006, 11 pgs.

Kim, et al., Flattened Butterfly: A Cost Efficient Topology for high Radix Networks, ACM SIGARCH Computer Architecture News, vol. 35, No. 2, ACM, Jun. 2007, 12 pgs.

Kim, et al., Microarchitecture of a High-Radix Router, ACM SIGARCH Computer Architecture News, vol. 33, No. 2, IEEE Computer Society, Jun. 2005, pp. 420-431.

Kim et al., Technology Driven Highly Scalable Dragonfly Topology, ACM SIGARCH Computer Architecture News, vol. 36, No. 3, 2008, pp. 77-88.

Mitra, Debasis, and Cieslak, Randall A. "Randomized parallel communications on an extension of the omega network." Journal of the ACM {JACM} vol. 34, No. 4, pp. 802-824, Oct. 1987.

Preparata, Franco P., and Vuillemin, Jean. "The cube-connected cycles: a versatile network for parallel computation" Communications of the ACM, vol. 24, No. 5, pp. 300 309, May 1981.

Sharma et al., Viking: A Multi Spanning Tree Ethernet Architecture for Metropolitan Area and Cluster Networks, INFOCOM 2004, Twenty-third Annual Joint Conference of the IEEE Computer and Communications Societies, vol. 4, IEEE, Mar. 2004, 12 pgs.

Siegel et al., Study of Multistage SIMD Interconnection Networks, Proceedings of the 5th annual symposium on Computer architecture, ACM, Apr. 1978, pp. 223-229.

Singh et al., Globally Adaptive Load Balanced Routing on Tori, Computer Architecture Letters, vol. 3, No. 1, 2004, 4 pgs.

Singh et al., Goal: A Load Balanced Adaptive Routing Algorithm for Torus Networks, ACM SIGARCH Computer Architecture News, vol. 31, No. 2, 2003, pp. 194-205.

Singh et al., Locality-Preserving Randomized Oblivious Routing on Torus Networks, Proceedings of the fourteenth annual ACM symposium on Parallel algorithms and architectures. ACM, Aug. 2002, 11 pgs.

Valiant, et al., Universal Schemes for Parallel Communication, Proceedings of the thirteenth annual ACM symposium on Theory of computing, ACM, May 1981, pp. 263-277.

Yuan, Xin, On Nonblocking Folded-Clos Networks in Computer Communication Environments, Parallel & Distributed Processing Symposium (IPDPS), 2011 IEEE International, IEEE, May 2011, 9 pgs.

Office Action dated Jun. 23, 2016 in U.S. Appl. No. 14/145,114.
Office Action dated Dec. 23, 2016 in U.S. Appl. No. 14/145,114.
Office Action dated Apr. 20, 2016 in U.S. Appl. No. 14/149,469.
Office Action dated Nov. 3, 2016 in U.S. Appl. No. 14/149,469.
Notice of Allowance dated Mar. 27, 2017 in U.S. Appl. No. 14/149,469.
U.S. Office Action dated Aug. 4, 2017 in U.S. Appl. No. 14/145,114.
Final Office Action dated Dec. 27, 2017 in U.S. Appl. No. 14/145,114.

* cited by examiner

SYSTEMS AND METHODS FOR ROUTING DATA THROUGH DATA CENTERS USING AN INDIRECT GENERALIZED HYPERCUBE NETWORK

RELATED APPLICATIONS

The present application is a continuation of, and claims the benefit of and priority to, U.S. patent application Ser. No. 14/149,469, titled "SYSTEMS AND METHODS FOR ROUTING DATA THROUGH DATA CENTERS USING AN INDIRECT GENERALIZED HYPERCUBE NETWORK," filed on Jan. 7, 2014, and now issued as U.S. Pat. No. 9,705,798 on Jul. 11, 2017, the entire contents of which are hereby incorporated by reference.

BACKGROUND

Servers in a data center are frequently arranged as leaf nodes in a "fat tree" of network devices that connect the servers to external networks. A fat tree can be generalized into three layers: an edge layer connecting to servers, an intermediary aggregation layer, and a root gateway layer connecting the tree to external networks. Each layer includes one or more network devices each bi-directionally linked to multiple devices in a lower layer. The bandwidth of each link is generally greater than (or "fatter" than) the bandwidth for a link at a lower layer. However, the aggregate bandwidth of the multiple links is generally reduced. As a result, in some cases, the upper layers of the fat tree are unable to accommodate the bandwidth demands of lower devices were they all to maximize their use of the provisioned bandwidth. That is, in many cases, the upper layers are over-subscribed and/or the lower layers are over-provisioned.

SUMMARY

In one aspect, the disclosure relates to a system. The system includes at least a first rack in a data center equipped with a first rack switch and a first server with at least a first network interface on the first server and a second network interface on the first server and a second rack in the data center equipped with a second rack switch and a second server with at least a first network interface on the second server and a second network interface on the second server. The system includes a first bi-directional network link directly connecting the first network interface on the first server in the first rack to the first rack switch, a second bi-directional network link directly connecting the first network interface on the second server in the second rack to the second rack switch, and a third bi-directional network link directly connecting the second network interface on the first server in the first rack to the second network interface on the second server in the second rack.

In some implementations of the system, each respective server is configured to determine if a data packet received at the server is addressed to a server other than the respective server and in response to determining that the received data packet is not addressed to the respective server, forward the data packet over one of the network interfaces of the server other than a network interface over which the data packet was received. In some implementations of the system, the first rack switch is configured to maintain a routing table for routing data packets addressed to servers within the data center, wherein the routing table includes at least one entry for forwarding a data packet via a bi-directional network link between a server in the first rack and a server in another rack. In some implementations, the routing table stores an indirect hypercube network routing topology for the data center.

In one aspect, the disclosure relates to a method. The method includes configuring at least a first rack in a data center with a first rack switch and a first server with at least a first network interface on the first server and a second network interface on the first server and configuring a second rack in the data center with a second rack switch and a second server with at least a first network interface on the second server and a second network interface on the second server. The method includes configuring a first bi-directional network link directly connecting the first network interface on the first server in the first rack to the first rack switch, configuring a second bi-directional network link directly connecting the first network interface on the second server in the second rack to the second rack switch, and configuring a third bi-directional network link directly connecting the second network interface on the first server in the first rack to the second network interface on the second server in the second rack.

In one aspect, the disclosure relates to tangible computer readable storage media storing non-transient processor-executable instructions that, when executed by a computing device including the storage media and one or more processors, cause the one or more processors to perform the operations of forwarding a data packet received at one of a first network interface and a second network interface to the other of the first network interface and the second network interface when the data packed received is addressed to a destination other than the computing device.

In one aspect, the disclosure relates to tangible computer readable storage media storing non-transient processor-executable instructions that, when executed by a computing device including the storage media and one or more processors, cause the one or more processors to perform the operations of maintaining a routing table for routing data packets addressed to servers within a data center, wherein the routing table includes at least one entry for forwarding a data packet via a bi-directional direct network link between a server in a first rack and a server in another rack. In some implementations, the routing table stores an indirect hypercube network routing topology for the data center.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Implementations described herein generally relate to networks at least a portion of which includes an indirect generalized hypercube network. A hypercube network is a set of network devices interconnected as vertices in a conceptual hypercube in one or more dimensions (an "n-Cube"). An indirect generalized hypercube network ("IGHN") is built from host servers in a data center. The host servers are grouped together in a data center by their respective edge layer connection. At least some of the host servers, in at least some of the groups, participate in an IGHN. Each participating host server is equipped with a network interface controller ("NIC") having at least two network interface ports. One interface is linked to a folded-Clos "fat tree" network for the data center via an edge layer device for the host server's group and the other interface is directly linked to a peer host server in another group. For example, a group of servers may be installed together in a rack and the rack may have a single router or switch (a "Top of Rack" or "TOR" switch) linking the servers in the rack, as a group, to the fat tree network. In some implementations, there are multiple groups of servers in a single rack, and each group of servers has its own respective ToR switch. Direct links between peer servers in different groups, using the additional network interface ports at the servers, by-passes the aggregation layer of the fat tree network. Each group of servers configured in this manner can act as a virtual switch in an IGHN.

Figure 1:
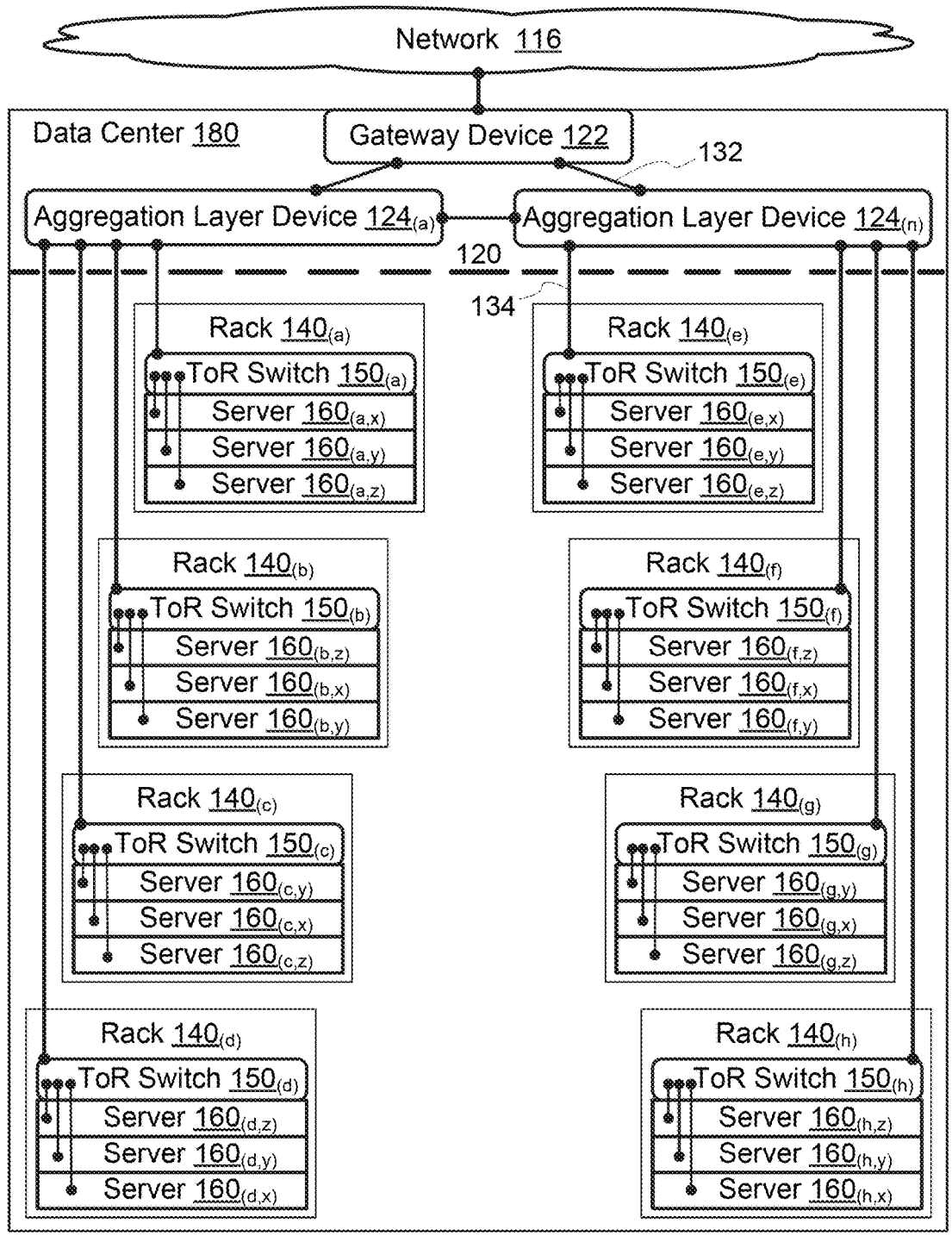
FIG. 1 is a block diagram of an example data center structured as a fat tree.
Figure 2A:
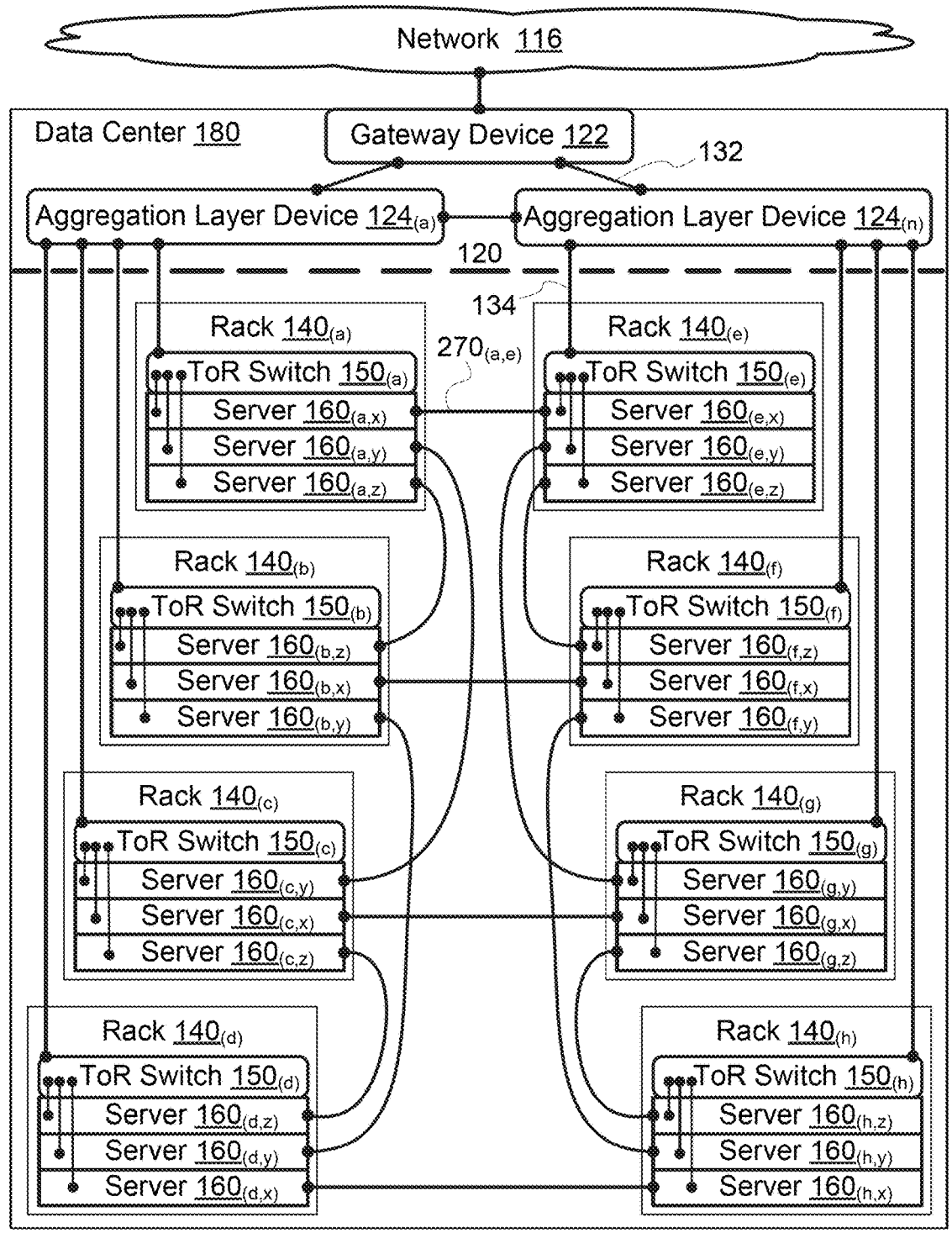
FIG. 2A is a block diagram of an example fat tree network integrated with an indirect generalized hypercube network configuration.
Figure 2B:
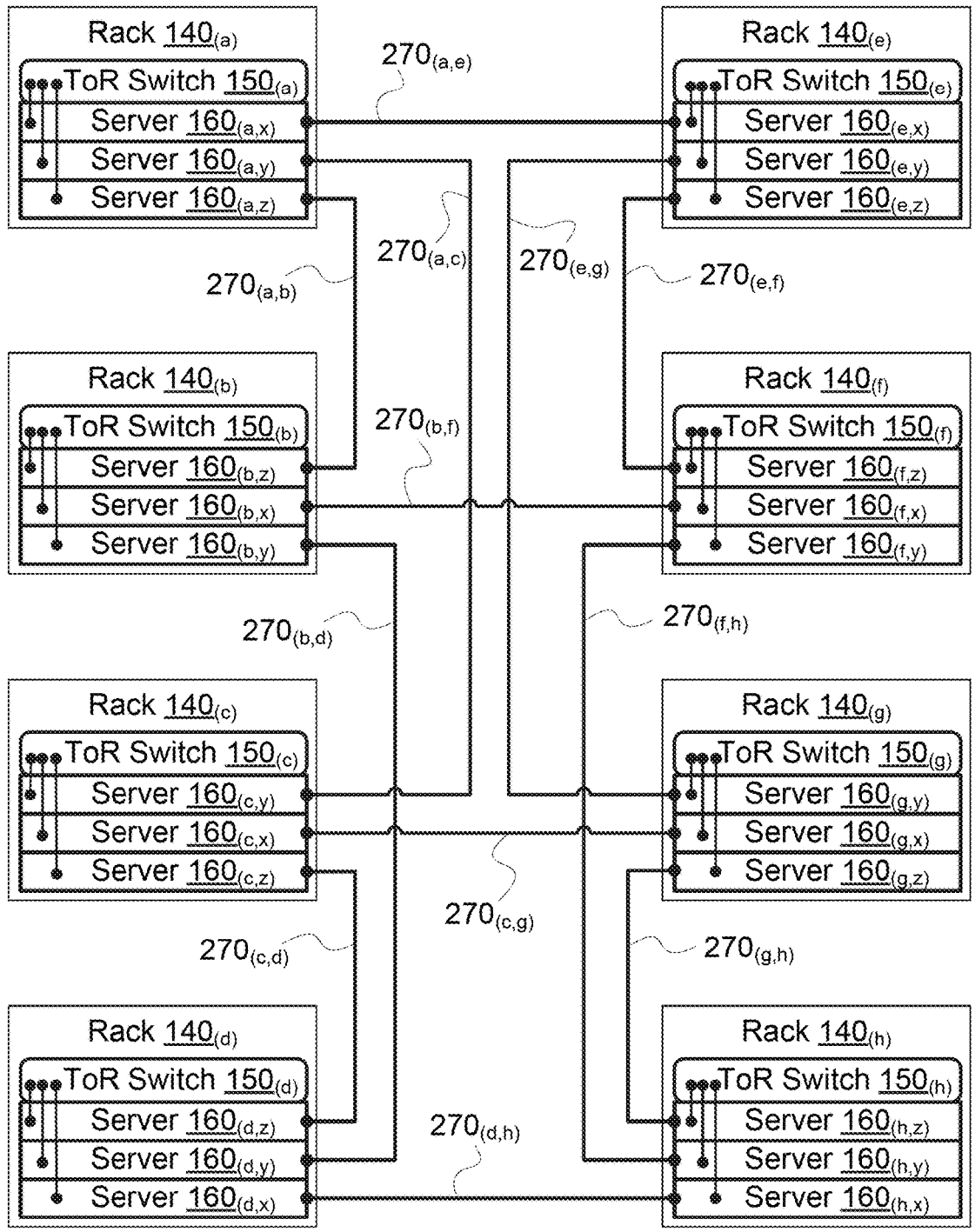
FIG. 2B is a block diagram of the example indirect generalized hypercube network configuration.
Figure 2C:
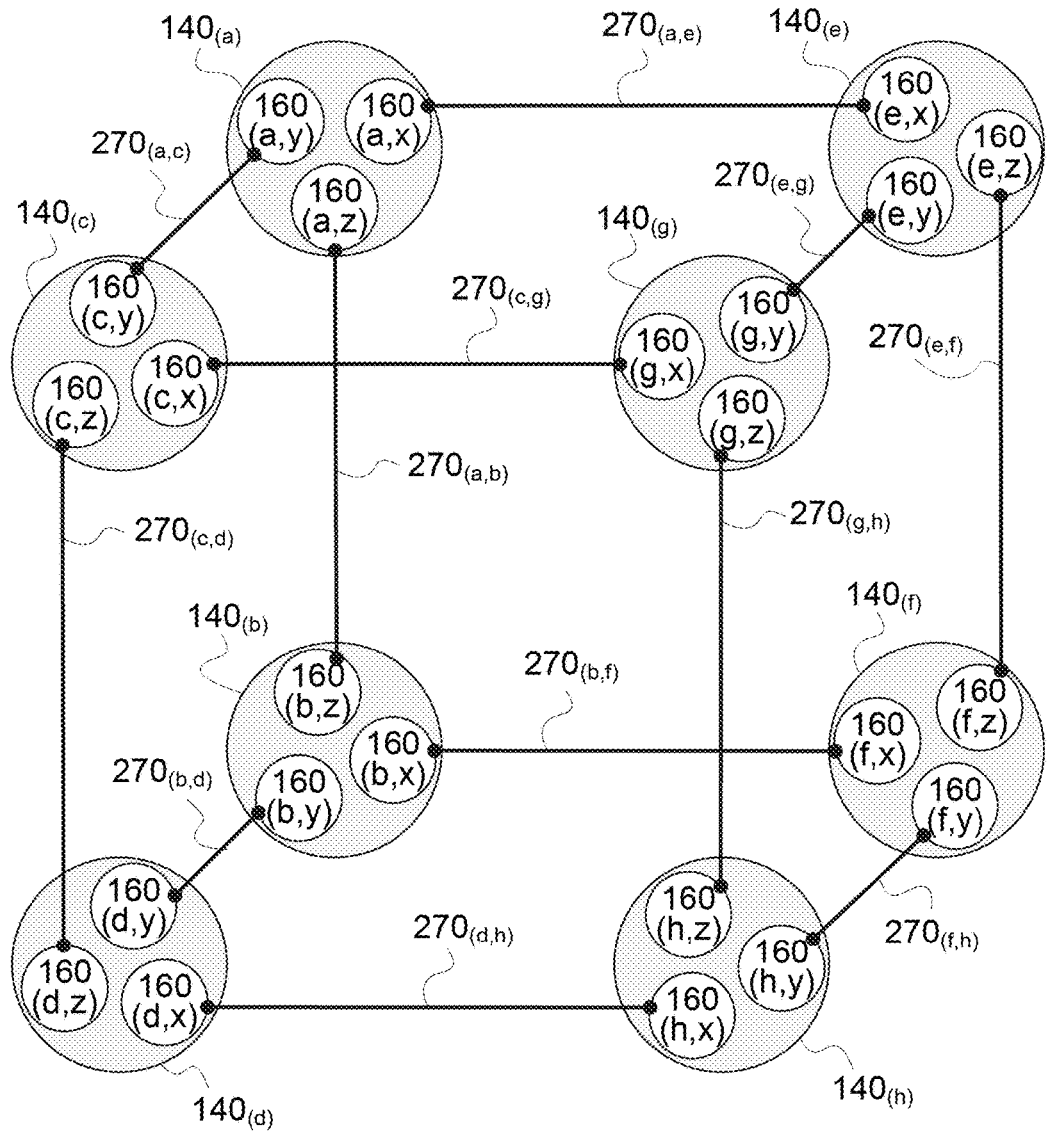
FIG. 2C is a block diagram of the example indirect generalized hypercube network configuration, illustrating the virtual switch aspect of the configuration.
Figure 3:
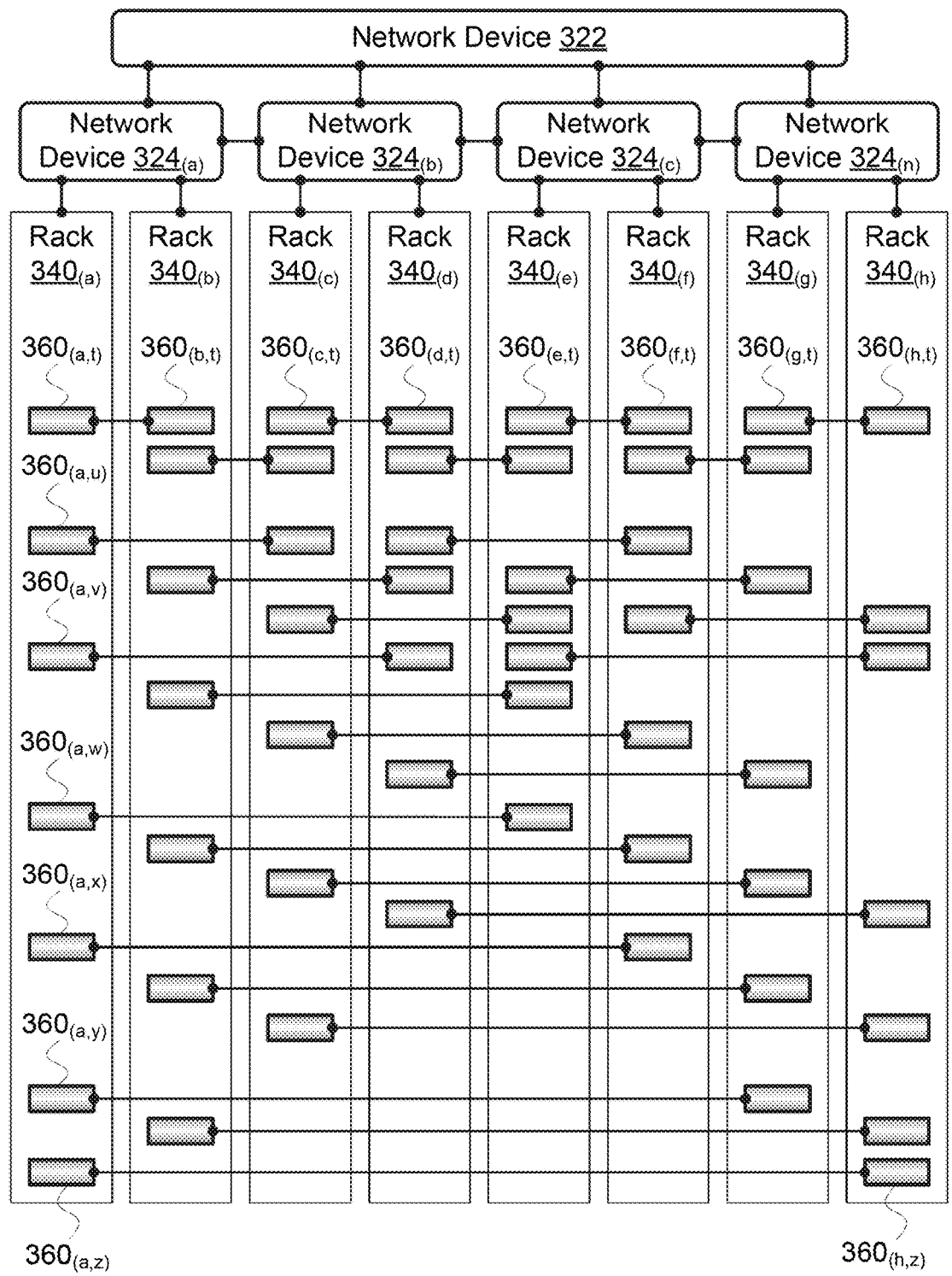
FIG. 3 is a block diagram of an example indirect generalized hypercube network configuration with a longest minimal path of one hop.

An IGHN is now described in the context of servers in a data center linked with a fat tree network topology. To provide a reference point, FIG. 1 illustrates a data center without an IGHN topology. FIGS. 2A-2C illustrate a first example of an IGHN integrated into the data center illustrated in FIG. 1. FIG. 3 illustrates a second example of an IGHN topology integrated into a similar fat tree network topology using a different hypercube configuration.

FIG. 1 is a block diagram of an example data center structured as a fat tree. In broad overview, a data center 180 houses multiple racks $140_{(a-h)}$. Racks are generally referred to as "racks 140," and specific racks are identified by an index value i. Each rack 140 groups together, and houses, a plurality of servers $160_{(a-h,x-z)}$. Servers are generally referenced as "servers 160," and specific servers are referenced by two index values i and j. The index value i identifies the rack housing the server, and the index value j identifies the particular server within the rack. Each rack 140 also houses at least one top of rack ("ToR") switch $150_{(a-h)}$. ToR switches are generally referenced as ToR switches 150, and specific ToR switches are referenced by the index values i of their respective racks. Although illustrated as a single group of servers per rack, in practice, a rack 140 may house multiple groups of servers and a ToR switch 150 for each group.

Each server 160 in a rack 140 is linked to a ToR switch 150 for the rack 140. The servers 160 are connected to an external data network 116 via a fat tree culminating in a gateway device 122. Two link-layers of the fat tree are illustrated. One illustrated link-layer includes the links (e.g., link 132) connecting a gateway device 122 and the aggregation layer devices $124_{(a-n)}$ (generally referenced as aggregation layer devices 124; the reference letters only indicate specific instances, of which there could be many). A second illustrated link-layer includes the links (e.g., link 134) connecting the aggregation layer devices 124 to the edge layer ToR switches 150. Thus a server 160 is connected to the external data network 116 via links between a ToR switch 150, an aggregation layer device 124, and a gateway device 122. FIG. 1 illustrates a simplified fat tree with only two aggregation layer devices 124 and one gateway device 122. In practice, a typical fat tree network can include many aggregation layer devices 124 organized in one or multiple hierarchical layers. A dashed line 120 separates the aggregation layer devices 124 and gateway device 122 in the illustrated fat tree from the rest of the data center 180.

In more detail, a data center 180 is a facility housing a number of host servers 160. The facility provides utilities such as shelter, electricity, and cooling to the host servers 160. For example, the data center 180 may be a building supplied with electricity by an electric utility and/or generators, and the building may be equipped with a ventilation or air conditioning system. In some implementations, the data center 180 is operated by a third-party. The data center 180 may house multiple sets of host servers. The host servers 160 participating in the indirect generalized hypercube network may be a sub-set of the host servers housed in the data center 180. The host servers 160 housed by a data center 180 are accessed externally via an external data network 116.

The external data network 116 is a network facilitating interactions between computing devices. An illustrative example external data network 116 is the Internet; however, other networks may be used. The external data network 116 may be composed of multiple connected sub-networks. The external data network 116 can be a local-area network (LAN), such as a company intranet, a metropolitan area network (MAN), a wide area network (WAN), an internetwork such as the Internet, or a peer-to-peer network, e.g., an ad hoc WiFi peer-to-peer network. The external data network 116 may be any type and/or form of data network and/or communication network. The external data network 116 may be public, private, or a combination of public and private networks. The external data network 116 is used to convey information between external computing devices and the host servers 160 within the data center 180.

As indicated above, one or more gateway devices 122 connect the host servers 160 to the external data network 116 through a fat tree culminating in the gateway devices 122. A gateway device 122 is a high bandwidth high capacity network device such as a router or a switch. In some implementations, a gateway device 122 connects to a corporate backbone or fiber, such that both sides of the gateway device 122 are under unified control. In some implementations, a gateway device 122 connects to a network service provider network, which may be provided by a third party. In some implementations, the gateway device 122 implements a firewall or filtering protocols to restrict data access to or from the data center 180.

The host servers 160 are physical computing devices co-located in the data center 180. Each host server 160 may be implemented as a computing system 410, as described below in reference to FIG. 4. The host servers 160 are housed in racks 140 and are connected to the external data network 116 via the above-described fat tree culminating in a gateway device 122. Generally, the host servers 160 provide data or computing services via the data network 116.

The data or computing services may require that the host servers 160 interact with each other, in addition to interacting with the network 116.

Each rack 140 is a physical housing for one or more groupings of host servers 160. For example, as illustrated, rack $140_{(e)}$ groups host servers $160_{(e,x\text{-}z)}$. Each rack 140 provides utilities such as shelter, electricity, and cooling to the host servers housed therein. For example, the rack may provide a physical housing for the host servers, a power supply system may regulate electrical power flow to the host servers, and the rack may include ventilation fans. In some implementations, the rack also includes an uninterruptable power supply system to smooth interruptions in power supply from the data center 180. Each rack 140 includes a Top of Rack ("ToR") switch 150 for each grouping of host servers 160 it houses. In some implementations, there may be multiple groupings of host servers 160, each with its own ToR switch 150. Each of the host servers 160 grouped by the rack has a data connection to the grouping's ToR switch.

A Top of Rack ("ToR") switch 150 is an edge layer device in the fat tree connecting a group of host servers 160 in a rack 140 to the external data network 116. Each host server 160 in a rack 140 has a data link to its respective ToR switch 150, and each ToR switch 150 connects its respective group of host servers 160 to at least one aggregation layer device 124. For example, rack $140_{(e)}$ houses a group of host servers $160_{(e,x\text{-}z)}$, which each have a link to a ToR switch $150_{(e)}$, and the ToR switch $150_{(e)}$ is connected to an aggregation layer device $124_{(n)}$ by a link 134. In some implementations, a ToR switch is connected to multiple aggregation layer devices.

FIG. 1 illustrates a simplified fat tree with only two aggregation layer devices $124_{(a\text{-}n)}$ and one gateway device 122. A fat tree can be generalized into three layers: an edge layer connecting to servers (e.g., the ToR switches 150), an intermediary aggregation layer (e.g., the aggregation layer devices $124_{(a\text{-}n)}$), and a root gateway layer (e.g., the gateway device 122) connecting the tree to external data networks. Each layer includes one or more network devices that are each bi-directionally linked to multiple devices in a lower layer. The bandwidth of each link (e.g., link 132) is generally greater than (or "fatter" than) the bandwidth of a link at a lower layer (e.g., link 134). However, the aggregate bandwidth of the links at a higher level is generally less than the aggregate bandwidth of the links at a lower level. That is, the upper layers of the fat tree (e.g., the aggregation layer devices $124_{(a\text{-}n)}$ and gateway device 122 above dashed line 120) are generally unable to accommodate all of the lower devices maximizing their use of the provisioned bandwidth. The upper layers (above dashed line 120) are thus often over-subscribed and/or the lower layers (below dashed line 120) are often over-provisioned. In practice, a typical fat tree network can include many aggregation layer devices 124 organized in one or multiple hierarchical layers. For example, in some implementations, the ToR switches in a data center are divided into groups, with each group of ToR switches linked to two or more spine-block switches; the spine-block switches are each linked to two or more aggregation switches, which are linked to access routers, which are linked to core routers, which are linked to one or more gateways. The additional links and devices provide additional bandwidth and resiliency.

The host servers 160 may interact with one another by sending and receiving data packets via the network links. In FIG. 1, the only route for a server in a first rack (e.g., host server $160_{(a,x)}$) to communicate with a server in a second rack (e.g., host server $160_{(e,x)}$) is for the server $160_{(a,x)}$ to send data packets up through the ToR switch $150_{(a)}$ to an aggregation layer device $124_{(a)}$, such that the data packets pass through the fat tree and come down through an aggregation layer device $124_{(n)}$ to another ToR switch $150_{(e)}$ to reach the destination server $160_{(e,x)}$. This route adds traffic to the over-subscribed fat tree above the dashed line 120, but that traffic does not leave the data center 180. Congestion related to such data traffic can be reduced by implementing an indirect generalized hypercube network ("IGHN") below the fat tree, providing an alternative path for data to travel between groups of servers.

FIGS. 2A and 2B are block diagrams of an example data center structured as a fat tree integrated with an indirect generalized hypercube network configuration. In broad overview, the servers $160_{(a\text{-}h,x\text{-}z)}$ in the data center 180 illustrated in FIG. 1 are modified to each support at least one additional network link. For example, FIG. 4, described below, illustrates a computing system 410 with multiple network interface ports. The additional links (labeled $270_{(a\text{-}g,b\text{-}h)}$ in FIG. 2B, where the letter pairs (a-g,b-h) identify the two groups of servers linked, and which are referred to generally as hypercube links 270) directly connect the additional network interface ports at peer servers 160 in different groups of servers. For example, host server $160_{(a,x)}$ is directly connected to host server $160_{(e,x)}$ by a link $270_{(a,e)}$.

In the computing system 410, each group of servers is in its own rack 140.—In some implementations, there may be multiple groups of host servers within a single physical rack.

FIG. 2B illustrates the same host servers 160 as illustrated in FIG. 2A and omits some of the detail shown in FIG. 2A, such as the fat tree above the dashed line 120. The detail is omitted only to more clearly label each link 270.

In more detail, the host servers 160 participating in the illustrated indirect generalized hypercube network each have a link 270 to a peer host server 160. Each rack 140 is illustrated as housing a group of three host servers 160. In practice, the number of host servers per grouping can be any number. In some implementations, there may be multiple links between at least one pair of server groups. In some implementations, not all host servers in a rack participate in an IGHN. As illustrated, each group of host servers 160 in each rack 140 is directly linked, via the IGHN, to three other groups of host servers 160 in three other racks 140. For example, there are three links 270 from the group of servers $160_{(a,x\text{-}z)}$ in rack $140_{(a)}$: a first link $270_{(a,e)}$ between server $160_{(a,x)}$ and server $160_{(e,x)}$, a second link $270_{(a,c)}$ between server $160_{(a,y)}$ and server $160_{(c,y)}$, and a third link $270_{(a,b)}$ between server $160_{(a,z)}$ and server $160_{(b,z)}$. The three links correspond to three routing options from the group of servers $160_{(a,x\text{-}z)}$ in the rack $140_{(a)}$ within the IGHN.

There are multiple equivalent-length paths between servers 160 through the IGHN. For example, there are three paths connecting a server 160 in the rack $140_{(a)}$ to a server 160 in a rack $140_{(h)}$. For example, a server $160_{(a,x)}$ may send a data packet to a server $160_{(h,x)}$ by a minimal path of link $270_{(a,e)}$, link $270_{(e,g)}$, and link $270_{(g,h)}$ or an equivalent minimal path of link $270_{(a,b)}$, link $270_{(b,d)}$, and link $270_{(d,h)}$. The data packet may also traverse a non-minimal route through the IGHN or traverse a route through a portion of the fat tree. In some implementations, each server 160 sends outgoing packets originated at the server and destined for a server in the IGHN, but not in the server's grouping, to the server's peer via the link 270. In some implementations, each server 160 sends outgoing packets to the server's respective ToR switch 150, and the ToR switch 150 determines a next-hop for routing the packet to its destination. To route within the IGHN, the ToR switch 150 can either forward the packet within the rack 140 to a server 160 that has a direct link to a server in the next-hop group of servers, or it can forward the packet up to an aggregation layer device 124. Thus each group of servers 160, and each group's respective ToR switch 150, can act as a virtual switch. More detail about routing packets within the IGHN is described below.

FIG. 2C is a block diagram of the example indirect generalized hypercube network configuration illustrated in FIGS. 2A and 2C. The illustration in FIG. 2C emphasizes the virtual switch aspect of the configuration. In broad overview, the groupings of servers (illustrated as one grouping per rack 140 in FIGS. 2A and 2B) are illustrated in FIG. 2C as vertices in a three-dimensional hypercube. Each of the servers $160_{(a-h,x-z)}$ illustrated in FIGS. 2A and 2B is shown within its respective rack $140_{(a-h)}$. Not shown are the respective Top of Rack switches $150_{(a-h)}$, which connect each server 160 within a respective grouping and connect the servers to the fat tree. Each group of servers 160, together with its respective ToR switch 150, act as virtual switches indirectly enabling data packets to be routed through the indirect hypercube network. The virtual switches may be labeled for routing purposes, for example, as indicated by the virtual switch binary labels 280.

In more detail, the virtual switch binary labels 280, may be used in identifying the virtual switches of the IGHN. Each group of servers 160 linked to a shared Top of Rack switch 140 acts a virtual switch, with each server 160 providing a virtual interface port to the virtual switch. To route data packets between the virtual switches, each virtual switch is assigned a label, e.g., the virtual switch binary labels 280.

In the illustrated three-dimensional IGHN, there are eight virtual switches each labeled with three binary digits. The term "dimension" is used in a geometric sense; however, it is convenient that the number of dimensions corresponds to the minimum number of links between virtual switches needed to connect any one host server to any other host server in the network, i.e., the longest minimal path. The virtual switches are labeled such that the hamming distance between the respective labels for any two virtual switches is equal to the minimal path length between the two virtual switches.

The virtual switches are also labeled such that the position of a difference in digits between two labels indicates the virtual interface for a link between the associated virtual switches. That is, if two labels differ in a single bit and that bit is the $N^{th}$ position, then the link between the two virtual switches is a link between $N^{th}$ virtual interface of each virtual switch. Thus a route from virtual switch 000 to virtual switch 101 has a minimal path of two and that path is through the first (x) and third (z) virtual interfaces (e.g., link $270_{(a,e)}$ connecting host server $160_{(a,x)}$ to host server $160_{(e,x)}$ and link $270_{(e,f)}$ connecting host server $160_{(e,z)}$ to host server $160_{(f,z)}$). Host server $160_{(e,x)}$ is indirectly connected to host server $160_{(e,z)}$ via their shared ToR switch $150_{(e)}$, thus this is an indirect route. This is the indirectness of the indirect generalized hypercube network.

The labels 280 may be used in network addresses for virtual interface ports of the virtual switches. Each host server 160 participating in the IGHN has at least two network interface ports, a first interface port directly linked to the ToR switch (towards the fat tree) and a second interface port directly linked to an interface port on a peer host server 160 (into the IGHN). The second interface port linking to a peer host via the IGHN acts as a virtual interface port for the virtual switch.

In some implementations, each interface port is assigned an IP or other network address that is unique at least within the network topology, e.g., unique amongst devices within the data center 180. For example, the interfaces linked to ToR switches may have IP addresses beginning with a prefix of 10 and the interfaces linked to peer servers may have IP addresses beginning with a prefix of 192.168. Each IP address may further identify a grouping (or ToR switch) for a server 160. For example, the IP address for a server may end with an identifier for the group of servers (or ToR switch) and an identifier for the server, e.g., 192.168.000.1 for server $160_{(a,x)}$, where "000" is the virtual switch label 280 and the 1 indicates the server itself.

In some implementations, the virtual switch labels are k-ary digits (digits of radix k), where k is the number of virtual switches participating in any one dimension of the IGHN. In the IGHN illustrated in FIGS. 2A-2C, there are two servers in any one dimension (i.e., k is 2), thus the labels 280 are binary. This k-ary labeling facilitates routing protocols that rely on the hamming distance between virtual switch labels, as discussed above.

The three dimensional IGHN illustrated in FIGS. 2A-2C is one example of an indirect generalized hypercube network. The network can be implemented with any number of dimensions and there can be any number of virtual switches participating in these dimensions. As one example, a binary (radix 2) four-dimensional IGHN can be constructed with 16 virtual switches and 4 virtual ports at each virtual switch (i.e., four host servers in each of sixteen virtual switches for a total of sixty-four host servers). As another example, a quaternary (radix 4) two-dimensional IGHN can be constructed with 16 virtual switches and 6 virtual ports at each virtual switch (i.e., six host servers in each of sixteen racks for a total of ninety six host servers). In general, an IGHN of dimension n and radix k has $k^n$ virtual switches. Each virtual switch has at least n(k−1) virtual network interface ports, one for each host server participating in the IGHN. Thus an IGHN of dimension n and radix k has $n(k-1)k^n$ hosts. By contrast, a direct hypercube can only have $k^n$ hosts.

FIG. 3 is a block diagram of an example server configuration for an octal (radix 8) one-dimensional IGHN integrated into a fat tree. That is, FIG. 3 is a block diagram of an example indirect generalized hypercube network configuration with a longest minimal path of one hop between any virtual switch. The one dimensional IGHN provides a single-hop minimum path between every virtual switch. In broad overview, network device 322 and network devices $324_{(a-n)}$ are network devices in a fat tree connecting servers $360_{(a-h,t-z)}$ in racks $340_{(a-h)}$ to other data networks (referenced generally as servers 360 in racks 340; the letters a-h indicate a specific rack and the letters t-z indicate a specific server within a rack). Each rack 340 has seven participating servers 360 (e.g., rack $340_{(a)}$ has servers $360_{(a,t-z)}$). Each participating server 360 in a rack 340 is connected to a peer server 360 in one of the other racks 340 such that each rack 340 has a server 360 directly linked to a server 360 in each of the other seven racks 340. In some implementations, a data center (e.g., the data center 180 illustrated in FIG. 1) is laid out as multiple rows of racks all joined to a fat tree, each row having sets of 8 groups of servers joined together as an octal one-dimensional indirect generalized hypercube network. Communication between the rows traverses the fat tree, but communication within a row can use the IGHN.

In more detail, the network device 322 and network devices $324_{(a-n)}$ are network devices in a fat tree connecting the servers 360 to other data networks. The network device 322 may be part of an aggregation layer or a gateway layer.

The network devices $324_{(a-n)}$ form a lower aggregation layer, illustrative of a fat tree. For example, the network device 322 and network devices $324_{(a-n)}$ may be routers or switches.

The host servers 360 are physical computing devices grouped into racks 340 and connected to a data network via the fat tree of network devices 322 and $324_{(a-n)}$. Each host server 360 may be a computing system 410, as described below in reference to FIG. 4. Generally, the host servers 360 provide data or computing services. The data or computing services may require that the host servers 360 interact with each other.

Each rack 340 is a physical grouping of host servers 360. For example, as illustrated, rack $340_{(a)}$ groups host servers $360_{(a,t-z)}$. Each rack 340 provides utilities such as shelter, electricity, and cooling to the host servers grouped. Each rack 340 includes a Top of Rack ("TOR") switch (not shown) to which the servers 360 in the rack are each connected. The ToR switch for the rack is an edge layer device for the fat tree and connects the host servers 360 in the rack to a network device 324 in the aggregation layer for the fat tree. Each of the host servers 360 grouped by the rack have a data connection to the ToR switch. In practice, a rack may house multiple groups of servers, each group of servers having its own respective ToR switch.

The indirect generalized hypercube network topologies described herein leverage host servers within the racks having multiple network interface ports. Each multi-interface server uses one or more interfaces to communicate with the fat tree, via the Top of Rack ("TOR") switch, and the remaining interfaces to communicate with the indirect generalized hypercube network topology. The ToR switch connects the servers within the rack, indirectly connecting the virtual interface ports of the IGHN into a virtual switch.

Figure 4:
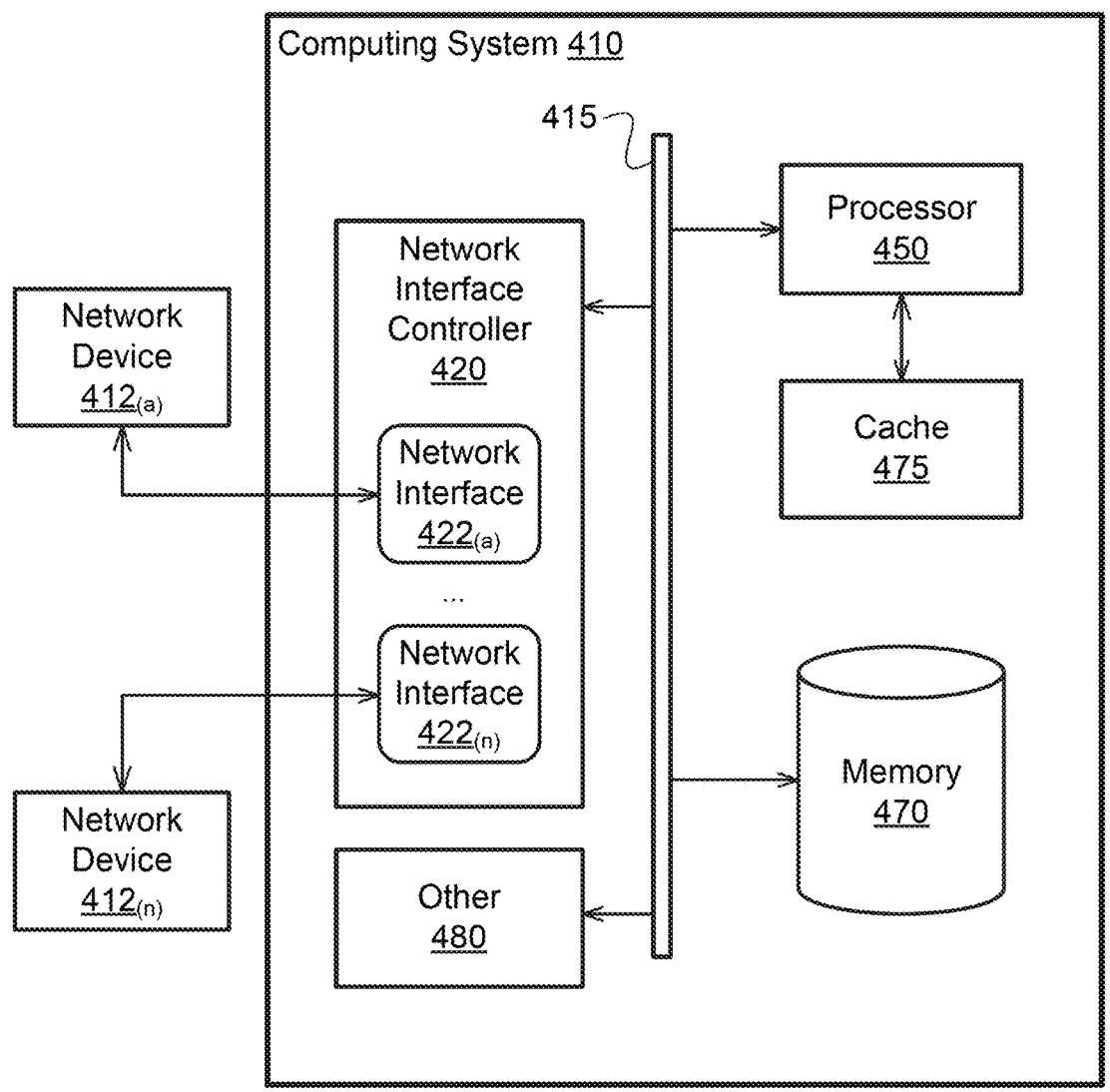
FIG. 4 is a block diagram of a computing system with multiple network interfaces, in accordance with an illustrative implementation.

FIG. 4 is a block diagram of a computing system 410 with multiple network interfaces $422_{(a-n)}$, for use in implementing the computerized components described herein. In broad overview, the computing system includes at least one processor 450 for performing actions in accordance with instructions and one or more memory devices 470 or 475 for storing instructions and data. The illustrated example computing system 410 includes one or more processors 450 in communication, via a bus 415, with at least one network interface controller 420 with network interface ports $422_{(a-n)}$ connecting to network devices $412_{(a-n)}$, memory 470, and any other devices 480, e.g., an I/O interface. Generally, a processor 450 will execute instructions received from memory. The processor 450 illustrated incorporates, or is directly connected to, cache memory 475.

In more detail, the processor 450 may be any logic circuitry that processes instructions, e.g., instructions fetched from the memory 470 or cache 475. In many embodiments, the processor 450 is a microprocessor unit or special purpose processor. The computing device 410 may be based on any processor, or set of processors, capable of operating as described herein. The processor 450 may be a single core or multi-core processor. The processor 450 may be multiple processors.

The memory 470 may be any device suitable for storing computer readable data. The memory 470 may be a device with fixed storage or a device for reading removable storage media. Examples include all forms of non-volatile memory, media and memory devices, semiconductor memory devices (e.g., EPROM, EEPROM, and flash memory devices), magnetic disks, magneto optical disks, and optical discs (e.g., CD ROM, DVD-ROM, and Blu-Ray® discs). A computing system 410 may have any number of memory devices 470.

The cache memory 475 is generally a form of computer memory placed in close proximity to the processor 450 for fast read times. In some implementations, the cache memory 475 is part of, or on the same chip as, the processor 450. In some implementations, there are multiple levels of cache 475, e.g., L2 and L3 cache layers.

The network interface controller 420 manages data exchanges via the network interfaces $422_{(a-n)}$ (also referred to as network interface ports). The network interface controller 420 handles the physical and data link layers of the OSI model for network communication. In some implementations, some of the network interface controller's tasks are handled by the processor 450. In some implementations, the network interface controller 420 is part of the processor 450. In some implementations, a computing system 410 has multiple network interface controllers 420. The network interfaces $422_{(a-n)}$ are connection points for physical network links. In some implementations, the network interface controller 420 supports wireless network connections and an interface port 422 is a wireless receiver/transmitter. Generally, a computing device 410 exchanges data with other computing devices $412_{(a-n)}$ via physical or wireless links to a network interface $422_{(a-n)}$. In some implementations, the network interface controller 420 implements a network protocol such as Ethernet.

The other computing devices $412_{(a-n)}$ are connected to the computing device 410 via a network interface port 422. The other computing devices $412_{(a-n)}$ may be peer computing devices, network devices, or any other computing device with network functionality. For example, a first computing device $412_{(a)}$ may be a network device such as a hub, a bridge, a switch, or a router, and a second computing device $412_{(n)}$ may be a computing device such as another computing device 410 (e.g., a host server).

The other devices 480 may include an I/O interface, external serial device ports, and any additional co-processors. For example, a computing system 410 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 410 includes an additional device 480 such as a co-processor, e.g., a math co-processor can assist the processor 450 with high precision or complex calculations.

In some implementations, one or more of the host servers 160 illustrated in FIGS. 1 and 2A-2C, one or more of the host servers 360 illustrated in FIG. 3, and/or one or more of the network devices illustrated in FIGS. 1-3, are constructed to be similar to the computing system 410 of FIG. 4. In some implementations, a computing system may be made up of multiple computing systems 410

Figure 5:
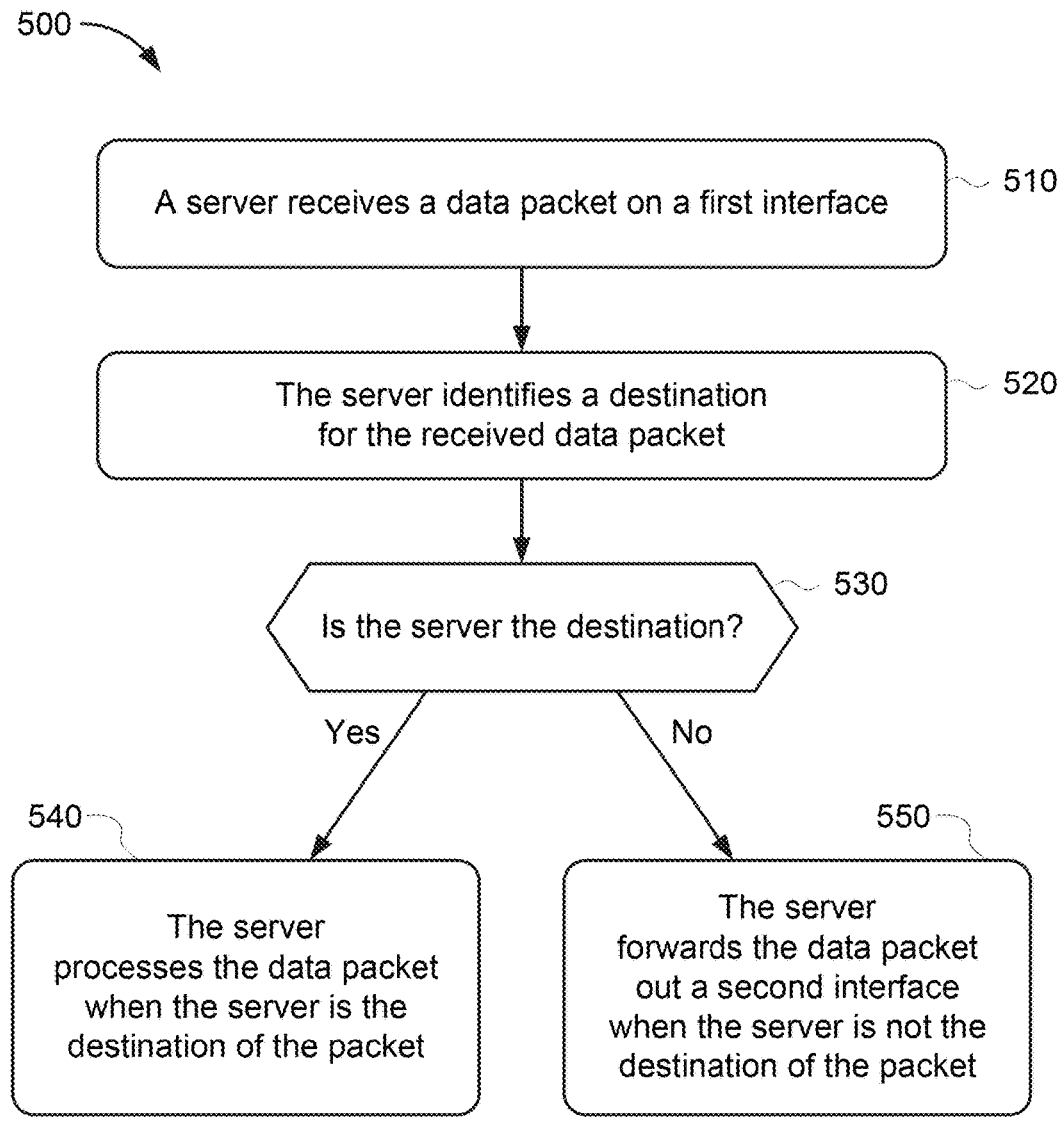
FIG. 5 is a flowchart for receiving a data packet by a computing system with multiple network interfaces.

FIG. 5 is a flowchart for handling a data packet received by a computing system with multiple network interfaces. In brief overview, the method 500 begins when a multi-interface server receives a data packet on a first interface (stage 510). The server identifies a destination for the received data packet (stage 520) and determines if the server is the destination (stage 530). The server processes the data packet when the server is the destination of the packet (stage 540). The server forwards the data packet out a second interface when the server is not the destination of the packet (stage 550).

In more detail, the method 500 begins when a multi-interface server receives a data packet on a first interface (stage 510). Referring to FIG. 4, the multi-interface server can be a computing system 410 with multiple network interface ports 422$_{(a-n)}$. The multi-interface server receives a data packet on a first interface, e.g., network interface ports 422$_{(a)}$. The interface may be connected to a Top of Rack switch for the multi-interface server. The interface may be connected to a peer server, e.g., a multi-interface server in another group of servers, which may be in the same rack or in another rack. For example, referring to FIGS. 2A-2C, a server 160$_{(a,x)}$ has a link to its ToR switch 150$_{(a)}$ and a link to a peer server 160$_{(e,x)}$ in another rack 140$_{(e)}$.

In the method 500, the multi-interface server identifies a destination for the received data packet (stage 520). The multi-interface server (e.g., server 160$_{(a,x)}$) examines the received packet, e.g., by parsing the packet header. In some implementations, the server's network interface controller 420 passes the packet to a general purpose processor in the multi-interface server to process the packet. In some implementations, the server's network interface controller 420 examines the packet, avoiding putting any load on the server's other processors unless the packet is addressed to the multi-interface server.

The multi-interface server determines if the server is the destination (stage 530). Each network interface port of the multi-interface server has a network address. In some implementations, the multi-interface server (e.g., server 160$_{(a,x)}$) determines that a packet that arrived on a first network interface with a destination address for a different network interface of the server has the server as its destination. If the destination of the packet is the multi-interface server, the server processes the data packet (stage 540).

If the destination of the packet is not the multi-interface server, the server forwards the data packet (stage 550). The network interface controller forwards the data packet out a second interface. For example, referring to FIGS. 2A-2C, a server 160$_{(a,x)}$ may receive a packet via a link to its ToR switch 150$_{(a)}$ and forward the packet on the link 270$_{(a,ex)}$ to a peer server 160$_{(e,x)}$ in another rack 140$_{(e)}$, or vice-versa. In an indirect generalized hypercube network (IGHN), the multi-interface server acts as a virtual interface port to a virtual switch. As an interface port, it need not process the packet. In some implementations, the server forwards the packet without updating the packet's header information. In a multi-interface server with only two interface ports, the server forwards a packet received at one interface port out the other interface port. In a multi-interface server with three or more interface ports, the server determines which interface port to use to forward the packet. For example, the server examines the next-hop address indicated in the packet's header and identifies the correct interface port for that address.

Figure 6:
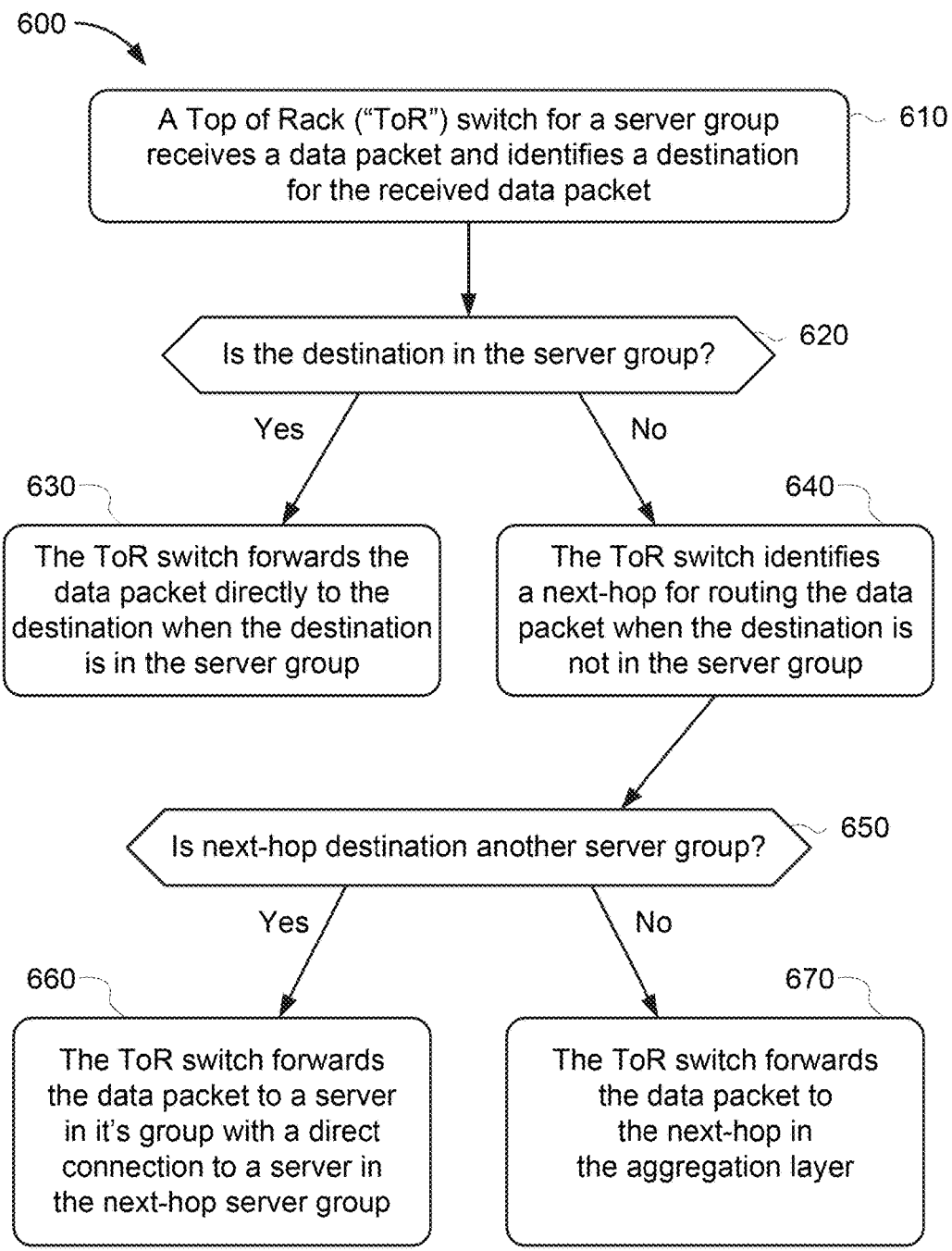
FIG. 6 is a flowchart for routing data packets in an indirect generalized hypercube network.

FIG. 6 is a flowchart for routing data packets within an indirect generalized hypercube network. In broad overview, a method 600 begins when a Top of Rack ("TOR") switch for a server group (e.g., a group of servers within a rack directly linked to the ToR switch) receives a data packet and identifies a destination for the received data packet (stage 610). The ToR switch determines if the destination is in its server group (stage 620). The ToR switch forwards the data packet directly to the destination when the destination is in the server group directly linked to the ToR switch (stage 630). The ToR switch identifies a next-hop for routing the data packet when the destination is not in the server group for the ToR switch (stage 640). The ToR switch determines if the next-hop destination is in another server group (with another ToR switch) within the IGHN (stage 650). When the next-hop destination is in another server group in the IGHN, the ToR switch forwards the data packet to a server in its group of servers with a direct connection to a server in the next-hop server group in the IGHN (stage 660). Otherwise, when the next-hop destination is not in the IGHN, the ToR switch forwards the data packet to the next-hop in the aggregation layer (stage 670). In practice, a packet with a destination within the IGHN may be routed through either a next-hop server group in the IGHN or a next-hop in the aggregation layer, e.g., when a direct link to the next-hop server group is congested.

In more detail, the method 600 begins when a ToR switch receives a data packet and identifies a destination for the received data packet (stage 610). The ToR switch may receive the packet via an interface connection to an aggregation layer device in the fat tree. The ToR switch may receive the packet via an interface connection to a host server directly linked to the ToR switch. The ToR switch parses the packet's header information and identifies a destination for the data packet. The destination is a field in the packet's header.

The ToR switch determines if the destination is in a group of servers directly linked to the ToR switch, i.e., its server group (stage 620). If the identified destination is for a host server directly linked to the ToR switch, the ToR switch will forward the packet to that host server (stage 630). If the identified destination is not within its server group, the ToR switch will determine where to send the packet next (stage 640). In some implementations, every host server has an IP address that includes an identifier for its corresponding server group such that the ToR switch can use a single rule to look for the identifier and determine if the destination of a packet is in a particular server group.

The ToR switch forwards the data packet directly to the destination when the destination is in its server group (stage 630). The ToR switch has a direct bidirectional link (or pair of unidirectional links) to each host server in its server group. When the data packet has header information indicating a destination server in the group of servers directly linked to the ToR switch, the ToR switch forwards the packet on the direct link to that destination server. In some implementations, the ToR switch maintains a routing table mapping destination server addresses to link ports.

If the destination is not in the group of servers linked to the ToR switch, the ToR switch identifies a next-hop for routing the data packet (stage 640). In some implementations, the ToR switch uses a routing table look up. In some implementations, the ToR switch implements a hypercube routing protocol. For example, C. Glass and L. Ni "The Turn Model for Adaptive Routing" (1994) describes several routing protocols for a direct hypercube. These protocols can be used with an indirect generalized hypercube network topology, treating each server group as a virtual switch. The routing protocols generally leverage the radix-k labeling of the virtual switches such that the hamming distance between the labels for any two virtual switches is the minimal path length between the virtual switches. For example, a virtual switch may select, as a next-hop, a destination along the dimension indicated by the most-significant (or least significant) digit that is different between the address of the virtual switch and the address of the packet's destination. In some implementations, the ToR switch randomly selects from a plurality of equivalent length minimal path routes to distribute load across multiple links. In some implementations, a non-minimal path routing protocol is used to reduce congestion on one or more links within the network.

In some implementations, a virtual switch monitors or measures link congestion and dynamically routes packets around congested links. For example, based on such congestion monitoring, the ToR switch may determine that links through the IGHN are congested and, as a result, select as the next hop a destination in the fat tree. In some implementations, network congestion may be monitored directly by a virtual switch, for example, by detecting queuing delays or lost data packets (e.g., unacknowledged TCP requests) over certain links. In some other implementations, host servers and ToR switches in the IGHN can instead explicitly communicate their relative congestion levels, for example, using control messages. In some implementations, congestion is detected using the Explicit Congestion Notification (ECN) protocol. ECN is a part of the TCP/IP protocol whereby network devices along a TCP path can mark packets to explicitly indicate that the device is congested. Other devices along that path can read the ECN indicators in the packets and select an alternate route around the congested path. In some implementations, for packets originating at a host server in an IGHN, the host server selects between a route via the IGHN or a route via the fat tree based on congestion visible to the host through the ECN indicators. See, for example, the method 700 illustrated in FIG. 7 and described in more detail below. In some implementations, a ToR switch receiving a packet from a host server will not forward that packet back to the sending host server; instead, the ToR switch forwards the packet up to the aggregation layer in the fat tree. Thus, the virtual switch including the ToR switch and the host server acts to route the packet around a congested link in the IGHN. In some implementations, the congestion-based path selection is adaptive and may be applied on a packet-by-packet basis. In some implementations, a packet flow may include an indicator (e.g., a quality of service setting in the packet's header) requesting in-order packet delivery, in which case the virtual switch may maintain a consistent route for a packet flow.

After identifying the next-hop destination for the packet, The virtual switch determines if the next-hop destination is in another server group in the IGHN (stage 650). If the routing decision in stage 640 selected a virtual switch of the IGHN as the next hop, the next-hop destination is in another server group within the IGHN. The ToR switch will forward the data packet to a host server in its rack that has a direct link to a peer host server in the identified next-hop (stage 660). If the routing decision in stage 640 selected a network device in the fat tree as the next hop, the ToR switch will forward the data packet to an appropriate device in the aggregation layer (stage 670).

As indicated above, in some implementations, the ToR switch forwards the data packets to a host server in its server group with a direct connection to a server in the next-hop server group when the next-hop destination is in the IGHN (stage 660). The host server in the ToR switch's server group can then blindly forward the packet to its peer host server in the other server group, without extensive processing, by carrying out the method described above in FIG. 5. The server in the other server group will also perform the method 500 and either accept the packet or forward it up to its own ToR switch for routing to another next hop. In this way, the host servers act as virtual network interfaces for virtual switches.

The ToR switch forwards the data packet to the next-hop in the aggregation layer when the next-hop destination is not in the IGHN (stage 670). The aggregation layer connects the servers of the IGHN to other networks. In some implementations, the aggregation layer connects multiple indirect generalized hypercube networks within a single data center.

Figure 7:
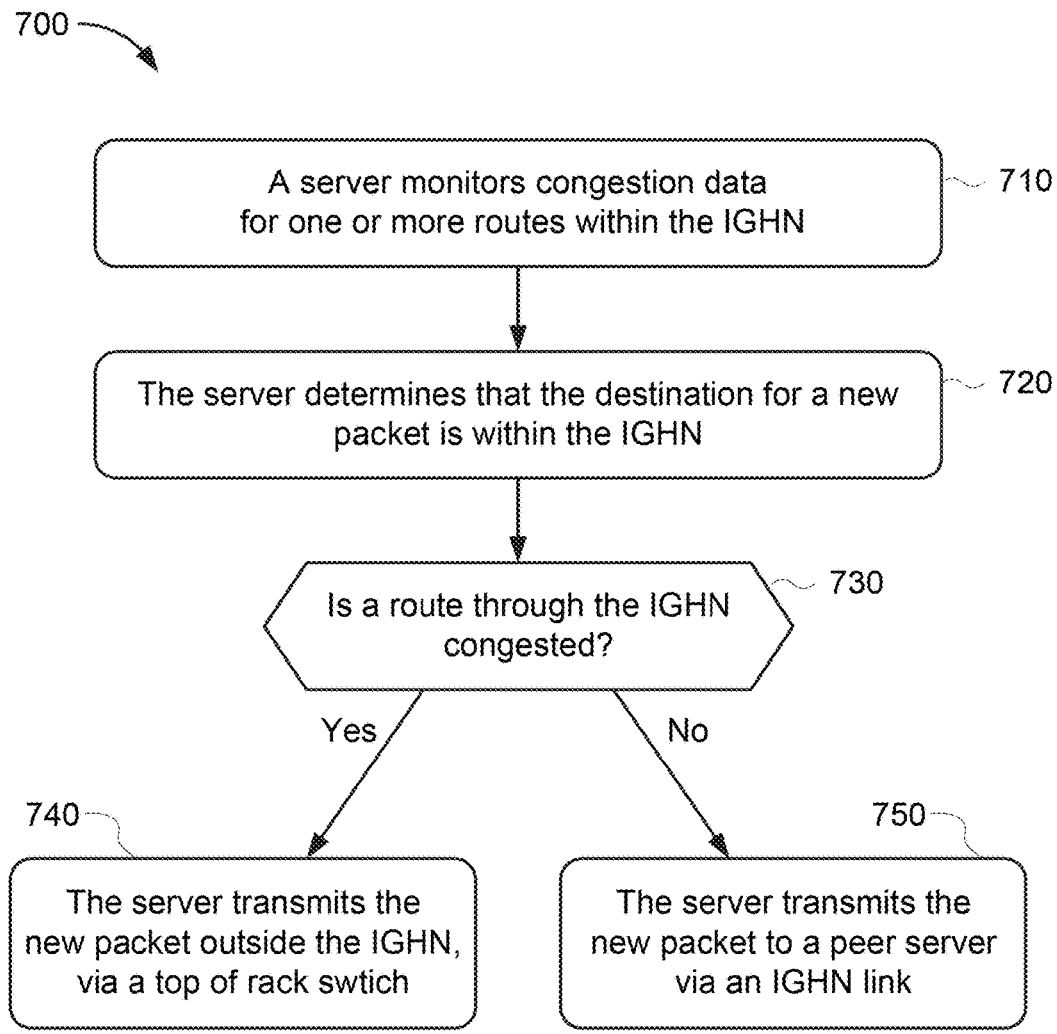
FIG. 7 is a flowchart for routing data packets around congestion in an indirect generalized hypercube network.

FIG. 7 is a flowchart for routing data packets around congestion within an indirect generalized hypercube networks. In brief overview, in the method 700, a server monitors congestion data for one or more routes within the IGHN (stage 710). When the server originates data packets, the server determines if the destination for a new packet is within the IGHN (stage 720). The server determines if the route through the IGHN is congested (stage 730). If the route is congested, the server transmits the new packet outside the IGHN, e.g., via its top of rack ("ToR") switch (stage 740). Otherwise, when the server has a more direct route within the IGHN that is not congested, the server transmits the new packet to a peer server via an IGHN link (stage 750).

In more detail, in the method 700 a server monitors congestion data for one or more routes within the IGHN (stage 710). The server has at least one link to the fat tree, e.g., via a ToR switch, and at least one direct link to a peer server within the IGHN. The server monitors congestion data for routes that use direct links to peer servers within the IGHN. For example, in some implementations, congestion is detected by the server using the Explicit Congestion Notification (ECN) protocol, as described above. In some implementations, congestion is detected as a number of dropped or lost data packets exceeding a threshold and/or a number of timeout events exceeding a threshold.

In the method 700, when the server originates data packets, the server determines if the destination for a new packet is within the IGHN (stage 720). In some implementations, the determination is on a packet-by-packet basis. In some implementations, the determination is for a packet flow. In some implementations, the server maintains routing data and/or network topology data for use in determining if a destination is within the IGHN. When the destination is not within the IGHN, the server transmits the packet to the fat tree, via the ToR switch. In some implementations, the server determines if a destination within the IGHN has a shortest path through the IGHN that starts with a first-hop that is directly linked to the server. If not, the server transmits the packet to the ToR switch. In some implementations, the server marks the packet for transmission to the fat tree or for transmission through the IGHN. For example, in some implementations, the server sets the fwmark value to indicate which route should be used. In some implementations, the ToR switch, or a controller for the ToR switch, maintains multiple routing tables including a table for routes within the IGHN and another table for routes through the fat tree. In some implementations, the ToR switch determines which of the multiple routing tables to use on a per-socket basis. In some implementations, the ToR switch determines which of the multiple routing tables to use based on an indicator in the header data for each packet, e.g., based on the fwmark value.

When the destination for a new packet is within the IGHN, such that it may be preferable to transmit the packet from the server directly to a peer server within the IGHN, the server determines if the route through the IGHN is congested (stage 730). This determination is made based on the congestion data from stage 710. In some implementations, the congestion status for a route is quantified as a score (e.g., a latency metric) and the determination is as to whether this score exceeds a threshold.

If the route through the IGHN is congested, the server transmits the new packet outside the IGHN, e.g., via its top of rack ("ToR") switch (stage 740). In some implementations, the server marks the packet to indicate to the ToR switch that the packet should be forwarded to the aggregation layer. In some implementations, the server is the logical next hop for the packet and the ToR switch is configured to refrain from sending a packet back to its source.

If the route through the IGHN is not congested, the server transmits the new packet to a peer server via a direct IGHN link (stage 750).

As described, host servers within an indirect generalized hypercube network (IGHN) can communicate with each other without burdening the over-subscribed fat tree hierarchy. The servers can communicate with networked computing devices not in the IGHN using the fat tree. In some implementations, packets with a destination outside of the IGHN travel through the IGHN and reach the fat tree via other network devices. The IGHN can facilitate load distribution within the fat tree and further reduce the burden on the over-subscribed devices and links. Although only a binary three-dimensional IGHN and an octal one-dimensional IGHN are illustrated, other radix and dimension combinations can be used. These include, without limitation, a binary four-dimensional IGHN, a quaternary two-dimensional IGHN, and a quaternary three-dimensional IGHN where two host servers link each pair of server groups in parallel.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system comprising:
    a first rack in a computer network facility equipped with a first rack switch and a first server with at least a first network interface on the first server having a first network address and a second network interface on the first server having a second network address, the second network address comprising a virtual switch identifier identifying the first rack switch and a dimension identifier identifying a position of the first server in the first rack, the first server storing the second network address;
    a second rack in the computer network facility equipped with a second rack switch and a second server with at least a first network interface on the second server and a second network interface on the second server;

a first bi-directional network link directly connecting the first network interface on the first server in the first rack to the first rack switch;

a second bi-directional network link directly connecting the first network interface on the second server in the second rack to the second rack switch;

a third bi-directional network link directly connecting the second network interface on the first server in the first rack to the second network interface on the second server in the second rack; and a gateway device connecting at least the first server and the second server to an external data network.

2. The system of claim 1, wherein the first rack in the computer network facility is equipped with a fourth server with at least a first network interface on the fourth server and a second network interface on the fourth server, the system further comprising:

a third rack in the computer network facility equipped with a third rack switch and a third server with at least a first network interface on the third server and a second network interface on the third server;

a fourth bi-directional network link directly connecting the first network interface on the fourth server in the first rack to the first rack switch;

a fifth bi-directional network link connecting the first network interface on the third server in the third rack to the third rack switch; and a sixth bi-directional network link directly connecting the second network interface on the fourth server in the first rack to the second network interface on the third server in the third rack.

3. The system of claim 1, wherein each respective server is configured to determine if a data packet received at the server is addressed to a server other than the respective server and in response to determining that the received data packet is not addressed to the respective server, forward the data packet over one of the network interfaces of the server other than a network interface over which the data packet was received.

4. The system of claim 1, wherein the first server is equipped with a network interface controller controlling the first network interface on the first server and the second network interface on the first server.

5. The system of claim 1, wherein the first server is configured to:

monitor congestion data for a first route that uses the third bi-directional network link directly connecting the second network interface on the first server in the first rack to the second network interface on the second server in the second rack; and determine whether to use the first route to transmit a data packet based on the congestion data.

6. The system of claim 1, wherein the first rack switch is configured to maintain a routing table for routing data packets addressed to servers within the computer network facility, wherein the routing table includes at least one entry for forwarding a data packet via a bi-directional network link between a server in the first rack and a server in another rack.

7. The system of claim 1, wherein:

the second network interface on the second server has a third network address, the third network address comprising a virtual switch identifier for the second rack and the dimension identifier.

8. The system of claim 5, wherein the first server is configured to:

use the first route for the data packet when the congestion data indicates that the first route is not congested, and use a second route for the data packet when the congestion data indicates that the first route is congested.

9. The system of claim 6, wherein the routing table stores an indirect generalized hypercube network routing topology for the computer network facility.

10. The system of claim 1, wherein the gateway device connects to the first server and the second server via an aggregation layer device.

11. A method of configuring multiple server racks in a computer network facility, the method comprising:

configuring a first rack in a computer network facility with a first rack switch and a first server with at least a first network interface on the first server having a first network address and a second network interface on the first server having a second network address, the second network address comprising a virtual switch identifier identifying the first rack switch and a dimension identifier identifying a position of the first server in the first rack, the first server storing the second network address;

configuring a second rack in the computer network facility with a second rack switch and a second server with at least a first network interface on the second server and a second network interface on the second server;

configuring a first bi-directional network link connecting the first network interface on the first server in the first rack to the first rack switch;

configuring a second bi-directional network link directly connecting the first network interface on the second server in the second rack to the second rack switch;

configuring a third bi-directional network link directly connecting the second network interface on the first server in the first rack to the second network interface on the second server in the second rack; and configuring a gateway device to connect at least the first server and the second server to an external data network.

12. The method of claim 11 comprising:

configuring a third rack in the computer network facility with a third rack switch and a third server with at least a first network interface on the third server and a second network interface on the third server;

configuring the first rack in the computer network facility with a fourth server with at least a first network interface on the fourth server and a second network interface on the fourth server;

configuring a fourth bi-directional network link directly connecting the first network interface on the fourth server in the first rack to the first rack switch;

configuring a fifth bi-directional network link directly connecting the first network interface on the third server in the third rack to the third rack switch; and configuring a sixth bi-directional network link directly connecting the second network interface on the fourth server in the first rack to the second network interface on the third server in the third rack.

13. The method of claim 11, wherein each respective server is configured to determine if a data packet received at the server is addressed to a server other than the respective server and in response to determining that the received data packet is not addressed to the respective server, forward the data packet over one of the network interfaces of the server other than a network interface over which the data packet was received.

14. The method of claim 11, wherein the first server is equipped with a network interface controller controlling the first network interface on the first server and the second network interface on the first server.

15. The method of claim 11, wherein the first rack switch is configured to maintain a routing table for routing data packets addressed to servers within the computer network facility, wherein the routing table includes at least one entry for forwarding a data packet via a bi-directional network link between a server in the first rack and a server in another rack.

16. The method of claim 11, wherein:
the second network interface on the second server has a third network address, the third network address comprising a virtual switch identifier for the second rack and the dimension identifier.

17. The method of claim 11, comprising configuring the gateway device to connect to the first server and the second server via an aggregation layer device.

18. The method of claim 11, comprising configuring the first server to:
monitor congestion data for a first route that uses the third bi-directional network link directly connecting the second network interface on the first server in the first rack to the second network interface on the second server in the second rack; and determine whether to use the first route to transmit a data packet based on the congestion data.

19. The method of claim 18, comprising configuring the first server to:
use the first route for the data packet when the congestion data indicates that the first route is not congested, and use a second route for the data packet when the congestion data indicates that the first route is congested.

20. The method of claim 15, wherein the routing table stores an indirect generalized hypercube network routing topology for the computer network facility.

* * * * *